United States Patent [19]

Ferguson

[11] 4,276,772

[45] Jul. 7, 1981

[54] FORCE TRANSDUCER

[75] Inventor: Andrew C. Ferguson, Sutton Coldfield, England

[73] Assignee: W. & T. Avery Limited, West Midlands, England

[21] Appl. No.: 81,348

[22] Filed: Oct. 3, 1979

[30] Foreign Application Priority Data

Feb. 24, 1979 [GB] United Kingdom ............ 79 06621

[51] Int. Cl.$^3$ ............................................. G01L 1/22
[52] U.S. Cl. .................................................. 73/862.62
[58] Field of Search .................... 73/141 A; 308/2 A; 338/5

[56] References Cited

U.S. PATENT DOCUMENTS

| | | | |
|---|---|---|---|
| 3,004,231 | 10/1961 | Laimins | 338/5 |
| 3,096,644 | 7/1963 | Seed | 308/2 A |
| 3,240,281 | 3/1966 | Schaevitz | 73/141 A |
| 4,107,985 | 8/1978 | Summer | 73/141 A |
| 4,181,011 | 1/1980 | Brenoel | 73/141 A |

Primary Examiner—Anthony V. Ciarlante
Attorney, Agent, or Firm—Norris & Bateman

[57] ABSTRACT

A force transducer comprises a block of material which is formed with a generally U-shaped or pi-shaped throughaperture 24 and a generally T-shaped throughaperture 26 in such a way as to form two loading members 10, 12 coupled together by first flexure elements 14, 16 which constrain the loading members to move in a predetermined direction under load and a second pair of flexure elements 18, 20 united by a connecting portion 22. In use, one loading member is connected to a fixture and the other is connected to a force receiver so that when one loading member is displaced relative to the other in said predetermined direction, the second flexure strips 18, 20 undergo a lateral deflection which is a measure of the applied force. This arrangement is particularly suitable for use with strain gauges as the flexures 18, 20 are subjected to a substantially uniform stress along their lengths when loaded.

10 Claims, 4 Drawing Figures

FORCE TRANSDUCER

DESCRIPTION

This invention relates to force transducers for use in the measurement of force, particularly in weighing applications.

In British Pat. No. 1,530,796, there is disclosed a force transducer including a pair of loading members coupled together and constrained for relative movement in a predetermined direction by a first pair of flexure elements and a second pair of flexure elements arranged in spaced apart relation and extending alongside one another in their lengthwise directions and in the direction of relative movement between the loading members, said second pair of flexure elements having one pair of end portions rigidly united with each loading member. When the loading members are subjected to a force which tends to move them relatively in said predetermined direction, the second pair of flexure elements deflect laterally about their roots, i.e. their connections with the loading members, and are substantially uniformly stressed along their lengths. This makes the arrangement particularly suitable for use with strain gauges because precise location of the gauges is of less importance than it is with other forms of strain gauge transducers. Such a transducer is hereinafter called force transducer of the kind specified.

One of the drawbacks with transducer constructions disclosed in the prior patent is that they are relatively expensive and laborious to manufacture as will be readily understood from an inspection of the embodiment of for example FIG. 2 of the prior patent which is fabricated from nine separate components. Also the response obtained with this known transducer tends not to be sufficiently consistent from one transducer to another and, in general, use of the known transducer has been limited to applications where a high degree of accuracy is not required.

The object of the present invention is to provide an improved force transducer of the kind specified which is much simpler and less expensive to manufacture and which gives a more reliable performance.

According to the present invention we provide a force transducer of the kind specified in which said loading members and at least said second pair of flexure elements are all embodied in a single block of material.

Preferably the first pair of flexure elements are also embodied in said block of material.

Thus, the force transducer of the present invention may be manufactured from a single block of material so that the loading members and said first and second pairs of flexure elements are all integrally united with one another. Not only does this avoid manufacturing the components separately from one another for subsequent assembly but the problem of rigidly connecting them together is also eliminated and because there are no separate intermediate connecting pieces, hysteresis effects are avoided at the junctions between components. In addition, the transducer response is more consistent thus enabling it to be used for applications requiring a high degree of precision.

In the preferred embodiment, the block of material is formed with first and second throughapertures extending between major faces thereof, said first throughaperture comprising a first portion which extends alongside one edge of the block and second and third portions which extend in spaced apart relation from the first portion towards the opposite edge of the block to embrace part of the second throughaperture therebetween such that the material separating the portions of the first throughaperture and said part of the second throughaperture constitutes said second pair of flexure elements and a portion rigidly uniting said one end portions of the same, the loading members being constituted by areas of the block flanking said second and third portions of the first throughaperture and the first flexure elements being constituted one by the material between said first portion and said one block edge and the other by material located between the second throughaperture and said opposite block edge. In addition, said second throughaperture is generally T-shaped having a stem portion which extends between said second and third portions of the first throughaperture and a cross piece portion which extends alongside said opposite block edge to define therewith said other first flexure element.

One feature of the invention is that the basic block configuration can be employed for different transducer capacities but with the block thickness varied according to the capacity required. Although it is conceivable to reduce the block thickness throughout, this can be disadvantageous in that the thickness of the loading members is reduced and the area available for end fixing of the loading members to a load receiver and fixture respectively is correspondingly reduced. In the preferred embodiment of the invention, the reduction in thickness is localised to the region occupied by the first and second flexure elements. Such thickness reduction may be effected by forming recesses of equal depth in both major faces of the block. As a general rule, to reduce the capacity of a given transducer by one half, the width of the block is reduced to substantially one half of its original value at least in the region occupied by said first and second flexure elements.

Preferably to reduce or avoid the tendency for the lower one of said first flexure elements to buckle under load, said first portion and said cross piece portion of the throughapertures are enlarged at their ends, preferably to form a dumbell configuration. This configuration provides a better match between the upper and lower first flexure elements with consequent improvement in performance. In addition, the amount of vertical resistance to motion afforded by the first flexure elements can be varied by changing the separation distance between the dumbell ends, i.e. the overall lengths of said first portion and cross piece portion of the throughapertures. In practice, the spring resistant to relative movement between the loading members should be provided primarily by the second flexure elements and the dumbell configuration is particularly advantageous in the case of very low capacity transducers because the first flexure elements would otherwise have to be of very small width.

Embodiments of the invention will now be described by way of example with reference to the accompanying drawings in which.

Figure 1:
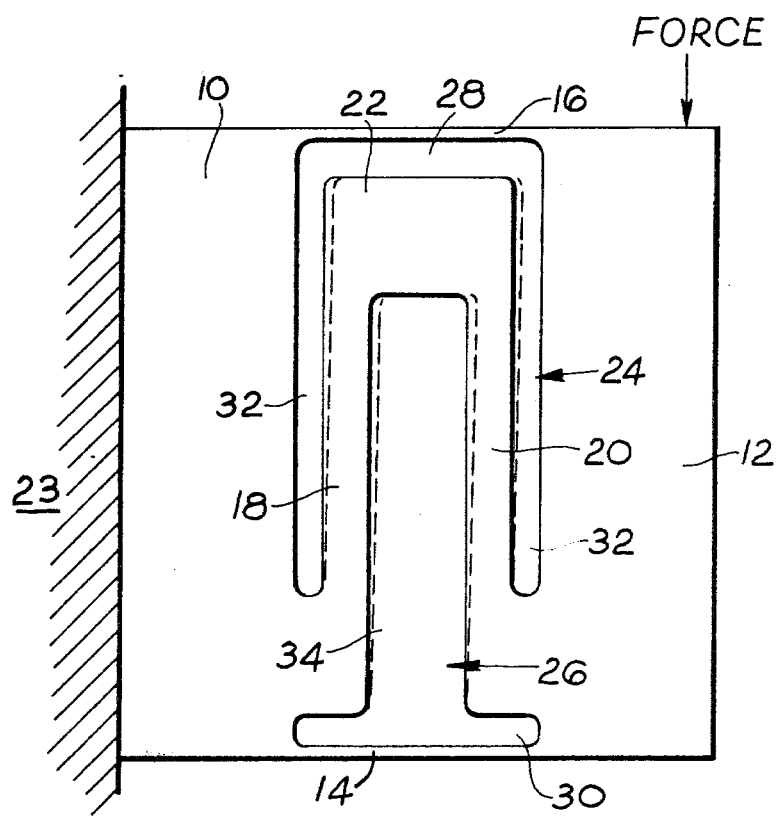
FIG. 1 is a front elevational view of a transducer in accordance with the invention.

Referring first to FIG. 1, the transducer comprises a generally rectangular or square block of material which may be of uniform thickness throughout or of variable thickness as will be described with reference to FIG. 2. The preferred material is a low temperature, air-hardening steel. The block embodies a pair of loading members 10, 12, a pair of flexures 14, 16 which are coupled together and constrain the members 10, 12 for relative movement in a generally vertical direction as seen in FIG. 1, and a pair of flexures 18, 20 which are integrally united by connecting portion 22. In use, one of the loading members, e.g. 10 is rigidly connected to a fixture 23 and the other 12 is rigidly connected to a force receiver (not shown) so that the forces act vertically on the member 12. Such forces cause the flexures 18, 20 to deflect laterally about the roots thereof, i.e. their connections with the loading members 10, 12, as indicated in dotted outline in FIG. 1 and a measure of the applied force can be obtained by means of strain gauges applied to those faces of the flexures 18, 20 which are perpendicular to the plane of the paper in FIG. 1.

The flexures 14, 16, 18 and 20 are defined in a manner which will be readily apparent from FIG. 1 by throughapertures 24, 26 formed in the block which are respectively generally U-shaped and generally T-shaped. The base 28 of the U and the cross piece 30 of the T are generally coextensive and demarcate the flexures 14, 16 whilst the parallel limbs 32 of the U and the stem 34 of the T demarcate the flexures 18, 20. In the illustrated embodiments, the stem 34 is wider than both of the limbs 32 and the limbs 32 are generally of the same length as the stem 34.

This configuration may be standard for a range of transducer capacities and the thickness of the block may be varied according to the capacity required. Advantageously, this is done by reducing the block thickness only in the central region occupied by the flexures 14, 16, 18 and 20 so that the thickness of the loading members 10, 12 is the same irrespective of transducer capacity. Thus, as shown in FIG. 2, the block may be formed with a central recess in each major face thereof, the recesses preferably being of equal depth.

Figure 2:
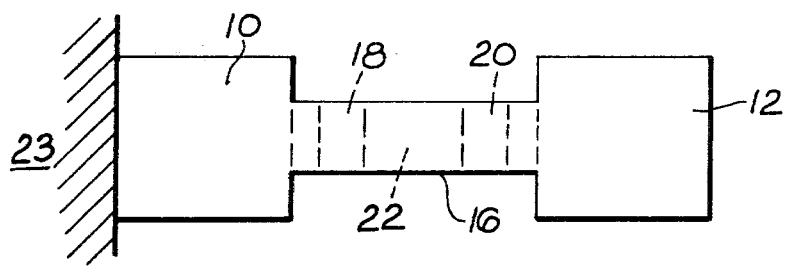
FIG. 2 is a plan view of a modification of FIG. 1.
Figure 3:
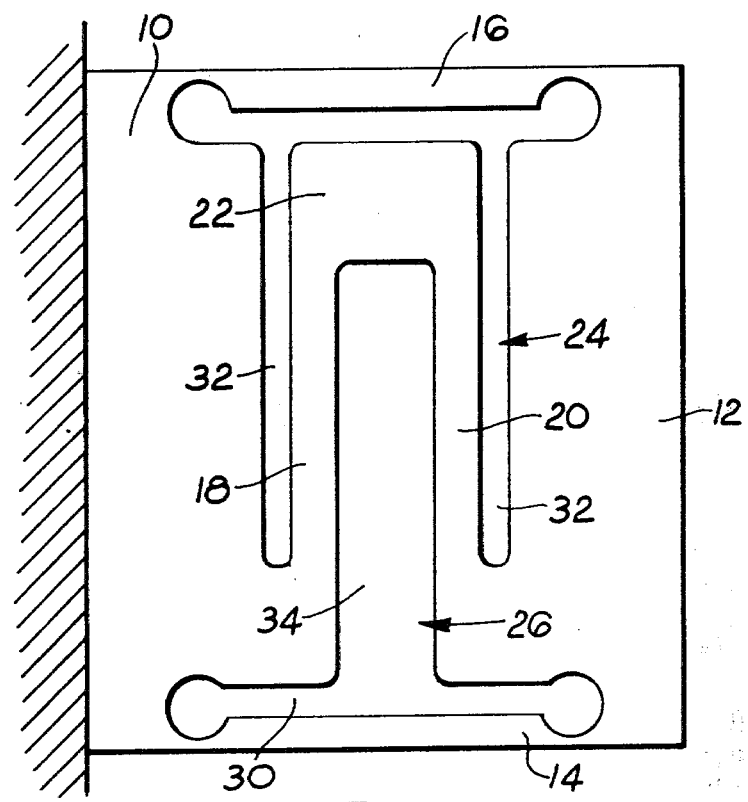
FIG. 3 is a front elevational view of a further modification of the embodiment in FIG. 1.
Figure 4:
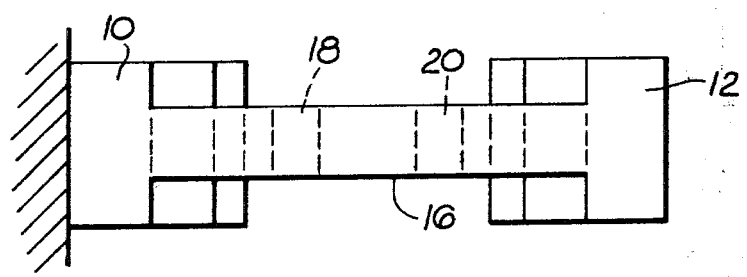
FIG. 4 is a plan view of the modification shown in FIG. 3.

FIGS. 3 and 4 show another embodiment which is generally the same as that of FIGS. 1 and 2 except that the throughapertures 24 and 26 are modified. Thus, the throughaperture 24 is generally pi-shaped and the cross pieces 28 and 30 of the two throughapertures are generally dumbell shaped with enlarged generally circular ends. Thus, bending under load occurs primarily in the area of the dumbell ends so that any tendency for the flexure 14 to buckle under load is reduced or eliminated and so that the flexures 14, 16 can be made relatively wide over the remainder of their lengths even when the transducer is intended for low capacity applications. The spring resistant afforded by the flexures 14, 16 can be varied by appropriate selection of the spacing between the dumbell ends. FIG. 4 illustrates the manner in which the thickness of the block may be reduced for lower capacity applications of the transducer.

As described above, the block embodies the loading members and both sets of flexures. However, it is also within the ambit of the invention for the upper and lower flexures 14, 16 to be formed separately from the block and subsequently joined to the loading members of the block in a manner analagous to the arrangement illustrated. In this event, the block can be manufactured by slotting it from opposite sides to form slots which serve the same functions as the throughapertures portions 32, 34 in the illustrated embodiments, i.e. to demarcate the U-shaped structure comprising the flexures 18, 20 and connecting portion 22. In effect, the block will be produced in similar fashion to the illustrated embodiments except for the omission of the material forming the flexures 14, 16 and the loading members will be coupled together by joining separate flexure strips thereto, which flexures act in a manner analagous to the flexures 14, 16 in the illustrated embodiments.

I claim:

1. A force transducer for force measurement, including a pair of loading members coupled together and constrained for relative movement in a predetermined direction by a first pair of flexure elements and a second pair of flexure elements arranged in spaced apart relation and extending alongside one another in their lengthwise directions and in the direction of relative movement between the loading members, each of said second pair of flexure elements having one end portion thereof rigidly united with a respective one of said loading members the arrangement being such that, when the loading members are subjected to a force which tends to move them relatively in said predetermined direction, the second pair of flexure elements deflect laterally about their connections with the loading members, characterized in that said loading members and at least said second pair of flexure elements are all embodied in a single block of material.

2. A transducer as claimed in claim 1 characterised in that said block of material is formed with first and second throughapertures extending between major faces thereof, said first throughaperture comprising a first portion which extends alongside one edge of the block and second and third portions which extend in spaced apart relation from the first portion towards the opposite edge of the block to embrace part of the second throughaperture therebetween such that the material separating the portions of the first throughaperture and said part of the second throughaperture constitutes said second pair of flexure elements and a portion rigidly uniting said one end portions of the same, the loading members being constituted by areas of the block flanking said second and third portions of the first throughaperture and the first flexure elements being constituted one by the material between said first portion and said one block edge and the other by material located between the second throughaperture and said opposite block edge.

3. A transducer as claimed in claim 2 characterised in that said second throughaperture is generally T-shaped having a stem portion which extends between said second and third portions of the first through aperture and a cross piece portion which extends alongside said opposite block edge to define therewith said other first flexure element.

4. A transducer as claimed in claim 3 characterised in that said second and third portions are substantially coextensive, said first portion and said cross piece portion are substantially coextensive and said stem portion is wider than both said second portion and said third portion.

5. A transducer as claimed in claim 3 or 4, characterised in that said cross piece portion and said first portion are enlarged at their ends and are preferably dumbell-shaped.

6. A transducer as claimed in any one of claims 1 to 4, characterised in that the block is of reduced thickness in at least the region occupied by said second flexure elements or at least in the region occupied by said first and second pairs of flexure elements.

7. A transducer as claimed in claim 1 characterised in that said first pair of flexure elements are separate from said block of material but united to the loading members and said block is formed with first and second spaced slots which extend alongside one another from one edge of the block towards the upper opposite edge and a third slot which extends from said opposite edge towards said one edge and between said first and second slots, said first slot forming with the first and second slots a generally U-shaped portion whose limbs constitute said second pair of flexure elements and which interconnects side portions of the block, which side portions constitute said loading members which, in turn, are separately connected by said first pair of flexure elements.

8. A transducer as claimed in claim 7 in that the block is of reduced thickness in at least the region occupied by said second flexure elements.

9. A transducer as claimed in claim 8 characterised in that the block is recessed at both of its major faces to create the reduced thickness region.

10. A transducer as claimed in any one of claims 1, 2, 3, 4, 7, 8, or 9 characterised in that said second pair of flexure elements provide at least a major part, preferably at least 90° of the spring resistant to forces applied to the loading members and said second flexure elements are provided with strain gauges attached to those faces of the elements which extend between the major faces of the block.

* * * * *

UNITED STATES PATENT AND TRADEMARK OFFICE
CERTIFICATE OF CORRECTION

PATENT NO. : 4,276,772
DATED : July 7, 1981
INVENTOR(S) : Andrew C. Ferguson

It is certified that error appears in the above—identified patent and that said Letters Patent is hereby corrected as shown below:

Column 2, line 6, cancel "said one end portions", and insert --the opposite end portions--.

Column 4, line 39, cancel "said one end portions", and insert --the opposite end portions--.

Signed and Sealed this

Fifth Day of October 1982

|SEAL|

Attest:

GERALD J. MOSSINGHOFF

Attesting Officer      Commissioner of Patents and Trademarks